United States Patent [19]

Tsao

[11] 4,190,639

[45] Feb. 26, 1980

[54] RECOVERY OF HYDROGEN CHLORIDE IN CARBO-CHLORINATION OF METAL OXIDES

[75] Inventor: Utah Tsao, Jersey City, N.J.

[73] Assignee: The Lummus Company, Bloomfield, N.J.

[21] Appl. No.: 945,308

[22] Filed: Sep. 25, 1978

[51] Int. Cl.² .............................................. C01B 9/02
[52] U.S. Cl. .................................... 423/491; 423/76; 423/137; 423/492; 423/496; 423/DIG. 12; 260/544 K
[58] Field of Search ............... 260/544 K; 423/76, 78, 423/79, 136, 137, 491, 492, 493, 502, 496, DIG. 12, 210.5

[56] References Cited

U.S. PATENT DOCUMENTS

| 2,444,289 | 6/1948 | Gorin et al. ...................... 260/544 K |
| 3,996,273 | 12/1976 | Daumas ........................... 260/544 K |

FOREIGN PATENT DOCUMENTS 711287 6/1965 Canada .

716681 10/1954 United Kingdom ...................... 423/78
1138975 1/1969 United Kingdom ..................... 423/136

*Primary Examiner*—Earl C. Thomas
*Attorney, Agent, or Firm*—Louis E. Marn; Elliot M. Olstein

[57] ABSTRACT

In the conversion of a metal oxide to a metal chloride by reaction with chlorine and carbon monoxide wherein hydrogen chloride is produced as byproduct, the byproduct hydrogen chloride is contacted with a molten salt mixture containing the higher and lower valent chlorides of a multivalent metal and oxygen to recover the hydrogen chloride by enriching the salt in the higher valent metal chloride. Essentially all of the chlorine values are recovered from the salt by direct contact with all or a portion of the carbon monoxide fresh feed to the metal chloride production, with such carbon monoxide stripping gaseous chlorine from the salt, as well as combining with the chlorine to produce phosgene. The carbon monoxide, chlorine and phosgene are employed in the metal chloride production.

8 Claims, 1 Drawing Figure

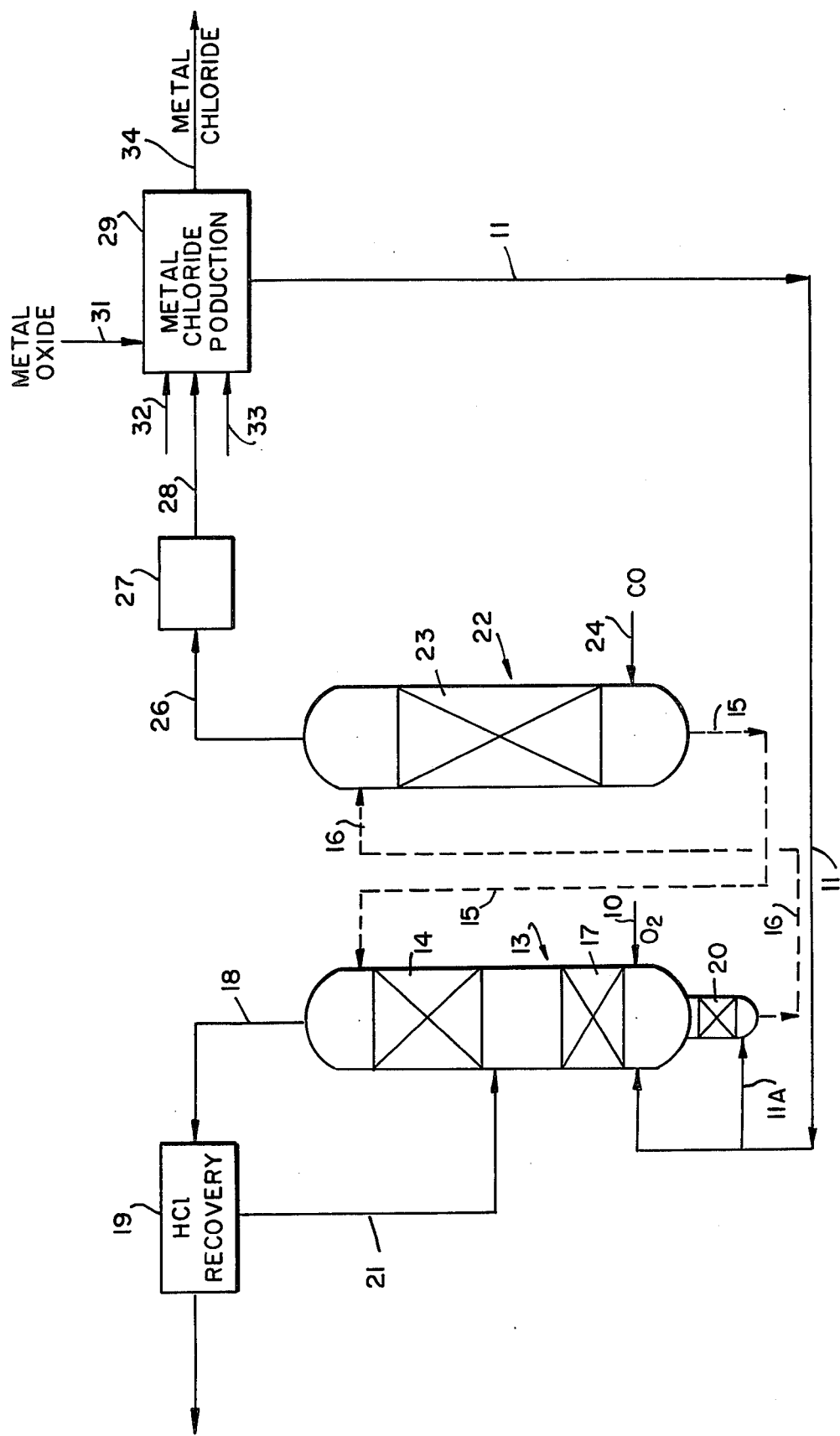

RECOVERY OF HYDROGEN CHLORIDE IN CARBO-CHLORINATION OF METAL OXIDES

This invention relates to the production of metal chlorides, and more particularly to the effective recovery of hydrogen chloride produced as byproduct in the carbo-chlorination of metal oxide to metal chloride.

Metal oxides, generally present in the form of an ore, are carbo-chlorinated to the corresponding metal chloride by the use of chlorine and carbon monoxide. Any moisture or hydrogen, which may be present in the feed material; in particular in the ore; produces hydrogen chloride in the vent stream subsequent to the recovery of the metal chloride. In general, such hydrogen chloride is either absorbed in water to produce acid or neutralized for disposal.

The present invention is directed to an improved process for recovering hydrogen chloride produced as byproduct in the conversion of a metal oxide to a metal chloride by the carbo-chlorination technique.

In accordance with the present invention there is provided an improvement in a process for converting a metal oxide to a metal chloride by carbo-chlorination with chlorine and carbon monoxide wherein hydrogen chloride is produced as byproduct by contacting such hydrogen chloride byproduct with oxygen and a molten salt mixture containing the higher and lower valent chlorides of a multi-valent metal to thereby recover the hydrogen chloride byproduct by enriching the salt in the higher valent metal chloride. The molten salt, now enriched in higher valent metal chloride, is contacted with all or a portion of the carbon monoxide to be employed as fresh feed in the carbo-chlorination, with said contacting being effected to recover essentially all of the chlorine values added to the salt by both stripping of chlorine from the salt and reaction to produce phosgene. Unreacted carbon monoxide, as well as stripped chlorine and produced phosgene are then employed in the carbo-chlorination of the metal oxide to a metal chloride. In this manner, the hydrogen chloride produced as by-product in the metal chloride production is effectively recovered in a form suitable for further reaction (as either phosgene or chlorine) with the metal oxide to produce metal chloride.

The molten salts contains the higher and lower valent chloride of a multi-valent metal; i.e., a metal having more than one positive valent state, such as manganese, iron, copper, cobalt and chromium, preferably copper. In the case of higher melting multi-valent metal chlorides, such as copper chlorides, a metal salt melting point depressant which is non-volatile and resistant to oxygen at the process conditions, such as a metal chloride having only one positive valent state, is added to the mixture to form a molten salt mixture having a reduced melting point. The metal chloride melting point despressant is preferably an alkali metal chloride, such as potassium and lithium chloride, in particular, but it is to be understood that other metal chlorides and mixtures thereof, such as the heavy metal chlorides, (heavier than copper) of groups I, II, III and IV of the Periodic Table; e.g., zinc, silver and thallium chloride, may also be employed. The metal chloride melting point depressant is added in an amount sufficient to maintain the salt mixture as a melt at the reaction temperatures, and is generally added in an amount sufficient to adjust the solidification point of the molten salt mixture to a temperature below about 550° F. The preferred melting point depressant is potassium chloride.

The reaction between the molten salt, containing the higher and lower valent chlorides of a multi-valent metal, preferably a mixture of cuprous and cupric chloride, with hydrogen chloride byproduct and oxygen is generally effected at a pressure in the order of from about 1 atm to about 20 atm, and preferably at a pressure of from 3 atm to about 6 atm. The reaction is effected at a salt inlet temperature generally in the order of from about 750° F. to about 950° F., and preferably from about 770° F. to about 840° F. The concentration of the higher valent metal chloride in the salt, prior to contacting is generally at a value to provide a higher valent metal chloride to total metal mole ratio in the order of from about 0.15:1 to about 0.6:1, preferably of from 0.35:1 to about 0.5:1.

The molten salt, now enriched in the higher valent metal chloride, is then subjected to a dechlorination reaction in order to recover essentially all of the chlorine values added to the salt. The dechlorination reaction is generally effected at a pressure in the order of from about 0.1 atm to about 5 atm. The molten salt feed to the dechlorination reaction is generally at a temperature of from about 800° F. to about 950° F., and preferably from 875° F. to about 930° F. The concentration of the higher valent metal chloride in the salt subjected to the dechlorination reaction is generally at a value to provide a high valent metal chloride to total metal mole ratio of from about 0.5:1 to about 0.7:1, and preferably from about 0.55:1 to about 0.6:1. The residence time is selected to provide the desired conversion, with longer residence times increasing production.

The dechlorination is effected by the use of all or a portion of the gaseous carbon monoxide to be employed as fresh feed to the metal chloride production with the gaseous carbon monoxide being employed to both chemically combine with chlorine values present in the salt to produce phosgene, and to strip the added chlorine values from the salt, as gaseous chlorine and thereby recover all of the chlorine values added to the salt. The salt inlet temperature to the oxidation reactor is generally at least 100° F. less than the inlet temperature to the phosgene production-dechlorination reactor, with the salt inlet temperature to the oxidation reactor generally being from 120° F. to 180° F. less than the salt inlet temperature to the phosgene production-dechlorination reactor. The carbon monoxide is employed in an amount sufficient to effect recovery of essentially all of the added chlorine values by both stripping and chemical combination to produce phosgene.

The gas recovered from the dechlorination reaction contains carbon monoxide, chlorine and phosgene, and such gas may be employed in the reaction for carbo-chlorination of a metal oxide to a metal chloride. Applicant has found that the phosgene present in the gas is effectively utilized in the conversion of metal oxide to metal chloride. Fresh feed chlorine, as well as any carbon monoxide fresh feed not employed in the dechlorination step, is also introduced into the carbo-chlorination reactor.

The carbo-chlorination of metal oxides to metal chlorides is well known in the art, and as a result, further details with respect to such carbo-chlorination are not required for a complete understanding of the present invention. In general, such carbo-chlorination is effected at a temperature in the order of from about 750° F. to about 1,850° F. In addition, as known in the art, when employing a metal oxide which contains water, in particular, when the metal oxide is in the form of an ore, water should be removed by calcination prior to the carbo-chlorination. As a practical matter, however, some water is generally present in the carbo-chlorination reaction, and as a result, hydrogen chloride is produced as a byproduct. Such hydrogen chloride production may be in the order of from 1 to 5 mol percent of the chlorine feed.

The metal oxide employed as feed material may be any one of the wide variety of metal oxides which are known to be suitable as feed for such a process, with the metal oxide preferably being titania or alumina. The process is of particular use in the conversion of metallic ores into metallic chlorides; in particular, an aluminum or titanium ore whereby the alumina or titania present therein is converted to aluminum chloride and titanium chloride, respectively.

After recovery of the metal chloride, there remains a vent gas, which includes hydrogen chloride byproduct, as well as carbon dioxide and any unreacted carbon monoxide. Such vent gas may be fed directly to the oxidation step to thereby recover the hydrogen chloride therefrom for eventual utilization of the chlorine values thereof in the metal chloride production.

The invention will be further described with respect to an embodiment thereof illustrated in the accompanying drawing wherein:

The drawing is a simplified schematic flow diagram of an embodiment of the invention.

Referring to the drawing, there is shown an oxidation reactor 13, containing means for increasing gas-liquid contact, such as packed beds 14, 17 & 20. A gas recovered from the production of a metal chloride, containing hydrogen chloride by-product and generally also carbon dioxide and carbon monoxide in line 11 is provided to oxidation reactor 13 through lines 11A and 11 and oxygen (generally as air) is provided through line 10, with oxygen and hydrogen chloride being introduced below bed 17 and additional hydrogen chloride being introduced between beds 14 and 17. Oxygen and sufficient hydrogen chloride are introduced below bed 17 to insure as far as possible that the molten salt withdrawn from the reactor is free of copper oxychloride (copper oxide). The dry recovered gas introduced below bed 20 through line 11A is to strip the molten salt, essentially free from moisture.

A molten salt mixture, containing cupric and cuprous chloride, and further including a melting point depressant, in particular, potassium chloride is introduced into reactor 13 through line 15 to countercurrently contact the gases introduced into the reactor through lines 10 and 11. The reactor 13 is operated at the conditions hereinabove described, and as a result of the countercurrent contact between the molten salt mixture and the gases introduced through lines 10 and 11, the hydrogen chloride is oxidized to chlorine, and such chlorine values are recovered by the molten salt by enriching the cupric chloride content of such molten salt.

A gaseous effluent, containing any unreacted oxygen, inerts, such as nitrogen introduced with the oxygen containing gas, carbon dioxide, carbon monoxide, equilibrium amounts of hydrogen chloride and some chlorine is withdrawn from reactor 13 through line 18 and introduced into a recovery zone schematically indicated as 19 to effect recovery of hydrogen chloride. The recovery zone for recovering hydrogen chloride may be as described in U.S. Pat. No. 3,968,200, which is hereby incorporated by reference. Recovered hydrogen chloride, generally as an aqueous solution thereof, is withdrawn from recovery zone 19 through line 21 and introduced into reactor 13 to effect oxidation thereof to enrich the molten salt in cupric chloride.

Molten salt enriched in cupric chloride and free of copper oxide is withdrawn from reactor 13 through line 16 and introduced into a dechlorination reactor 22, containing suitable means for increasing gas-liquid contact, such as a packed bed 23. Carbon monoxide which is to be employed in the metal chloride production is introduced into the bottom of reactor 22 through line 24.

Reactor 22 is operated at the conditions hereinabove described, with the carbon monoxide functioning to strip chlorine from the salt and to also effect chlorine recovery by chemical reaction to produce phosgene. As hereinabove noted, carbon monoxide is introduced in an amount and the reactor is operated at conditions to provide for recovery of all the chlorine values added to the salt in oxidation reactor 13, with such chlorine values being recovered as phosgene and chlorine.

Molten salt, having a reduced content of cupric chloride, is withdrawn from reactor 22, and recycled to reactor 13 through line 15.

A gaseous effluent, containing carbon monoxide, chlorine and phosgene is withdrawn from reactor 22 through line 26, and further treated in a separation zone 27 to remove any vaporized salt therefrom. Such vaporized salt is preferably removed as described in U.S. Application Ser. No. 870,351, filed on Jan. 18, 1978, which is hereby incorporated by reference.

The gas recovered from zone 27, in line 28, includes carbon monoxide, chlorine and phosgene, and such gas is introduced into a metal chloride production zone, schematically generally indicated as 29 wherein such gas is employed in the carbo-chlorination of a metal oxide introduced through line 31. In addition, fresh feed chlorine is introduced into zone 29 through line 32, and any additional carbon monoxide requirements for the production of metal chloride is introduced into zone 29 through line 33.

The metal oxide chlorination zone is operated as known in the art to effect conversion of metal oxide to metal chloride. Such metal chloride product is recovered from zone 29 through line 34.

In addition, as hereinabove noted, there is recovered from the metal chloride production zone 29 a gas stream, which contains hydrogen chloride by-product, as well as carbon dioxide and any unreacted carbon monoxide. Such gas stream is recycled to the oxidation reactor 13 through line 11 to effect recovery of the hydrogen chloride, as hereinabove described.

Although the invention has been described with respect to a specific embodiment thereof, it is to be understood that the scope of the present invention is not to be limited to the embodiment specifically described with respect to the drawings.

The present invention is particularly advantageous in that it permits effective recovery of hydrogen chloride produced as by-product in a process for converting a metal oxide to a metal chloride, and the subsequent utilization of such recovered hydrogen chloride in the metal chloride production. Moreover, such recovery is easily effected by the use of a gas which is to be employed in the metal chloride production operation. In addition, the use of such gas provides the advantage that such chlorine values are easily recovered by the use of a combination of stripping and chemical combination, with the chemically produced product being effectively utilized in the metal chloride production.

Numerous modifications and variations of the present invention are possible in light of the above teachings and, therefore within the scope of the appended claims, the invention may be practiced otherwise then as particularly described.

I claim:

1. In a process for converting a metal oxide to a metal chloride by carbo-chlorination with chlorine and carbon monoxide wherein there is produced a gas containing by-product hydrogen chloride, the improvement comprising:
   (a) contacting said gas containing by-product hydrogen chloride with oxygen and a molten salt mixture containing the higher and lower valent chlorides of a multi-valent metal to recover by-product hydrogen chloride by enriching the molten salt mixture in the higher valent metal chloride;
   (b) contacting molten salt from step (a) with at least a portion of the carbon monoxide to be employed as fresh feed in said carbo-chlorination, said contacting being effected to recover essentially all of the chlorine values added to said molten salt mixture in step (a) by both stripping of gaseous chlorine from the salt and reaction to produce phosgene;
   (c) recovering from step (b) carbon monoxide, chlorine and phosgene; and
   (d) employing recovered carbon monoxide chlorine and phosgene in said carbo-chlorination of a metal oxide to a metal chloride.

2. The process of claim 1 wherein step (a) is effected at a temperature of from 750° F. to 950° F., a pressure from 1 to 20 atmosphere and step (b) is effected at a temperature of from 800° F. to 950° F. and a pressure of from 0.1 atmospheres to 5 atmospheres.

3. The process of claim 2 wherein the molten salt mixture introduced to step (a) is at a temperature of at least 100° F. less than the temperature of the molten salt mixture introduced into step (b).

4. The process of claim 3 wherein the molten salt mixture employed in step (b) is essentially free of metal oxide and hydrogen chloride.

5. The process of claim 4 wherein the molten salt mixture contains cupric chloride and cuprous chloride.

6. The process of claim 1 wherein the metal oxide is alumina.

7. The process of claim 1 wherein the metal oxide is titania.

8. The process of claim 1 wherein said carbo-chlorination is effected at a temperature of from 750° F. to 1850° F.

* * * * *